United States Patent [19]
Hoshino et al.

[11] Patent Number: 4,944,021
[45] Date of Patent: Jul. 24, 1990

[54] IDENTIFICATION SYSTEM EMPLOYING VERIFICATION OF FINGERPRINTS

[75] Inventors: Yukio Hoshino; Ko Asai, both of Tokyo, Japan

[73] Assignee: NEC Corporation, Tokyo, Japan

[21] Appl. No.: 418,990

[22] Filed: Oct. 6, 1989

Related U.S. Application Data

[63] Continuation of Ser. No. 134,554, Dec. 16, 1987, abandoned, which is a continuation of Ser. No. 724,232, Apr. 17, 1985, abandoned.

[30] Foreign Application Priority Data

| Apr. 18, 1984 | [JP] | Japan | 59-78155 |
| Apr. 18, 1984 | [JP] | Japan | 59-78156 |
| Apr. 18, 1984 | [JP] | Japan | 59-78157 |
| Apr. 18, 1984 | [JP] | Japan | 59-78158 |
| Apr. 18, 1984 | [JP] | Japan | 59-78159 |

[51] Int. Cl.$^5$ .............................................. G06K 9/00
[52] U.S. Cl. ............................................ 382/5; 382/4; 382/34
[58] Field of Search .............. 382/2, 4, 5, 34, 48; 340/825.3, 825.33, 825.34; 356/71

[56] References Cited

U.S. PATENT DOCUMENTS

| 3,928,842 | 12/1975 | Green et al. | 382/4 |
| 4,151,512 | 4/1979 | Riganati et al. | 382/5 |
| 4,185,270 | 1/1980 | Fischer et al. | 382/5 |
| 4,210,899 | 7/1980 | Swonger et al. | 382/5 |
| 4,310,827 | 1/1982 | Asai | 382/21 |
| 4,581,760 | 4/1986 | Schiller et al. | 382/4 |
| 4,582,985 | 4/1986 | Löfberg | 382/4 |

FOREIGN PATENT DOCUMENTS 0029875 2/1985 Japan .................. 382/4

Primary Examiner—Leo H. Boudreau
Assistant Examiner—Jose L. Couso
Attorney, Agent, or Firm—Sughrue, Mion, Zinn, Macpeak & Seas

[57] ABSTRACT

An identification system for identifying authorized personnel compares a streaked pattern of a fingerprint of an individual with selected fingerprint patterns stored in memory of all authorized personnel in order to determine if the individual is included among the authorized personnel. The streaked pattern is compared with the fingerprint patterns stored in memory on the basis of characteristics between a reference point of a fingerprint and its relationship to other selected points of the fingerprint.

13 Claims, 4 Drawing Sheets

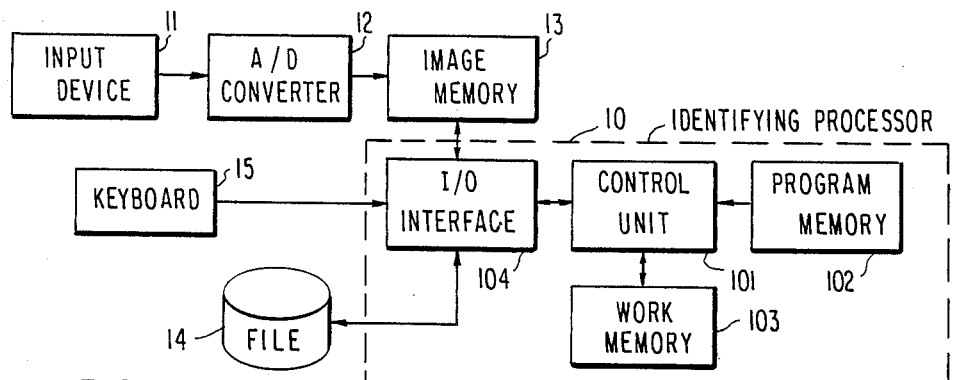
FIG. 1
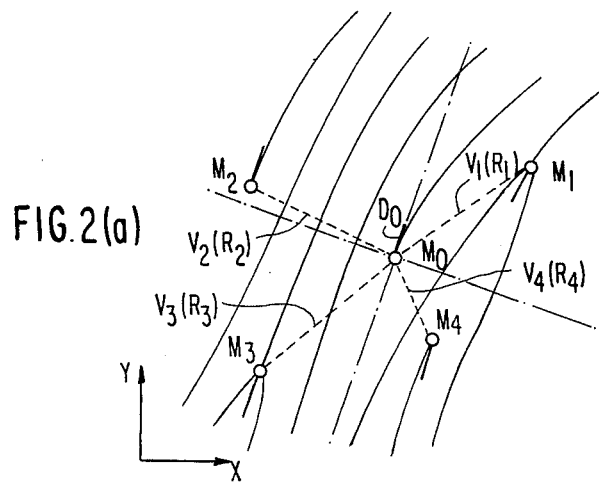
FIG. 2(a)
FIG. 2(b)
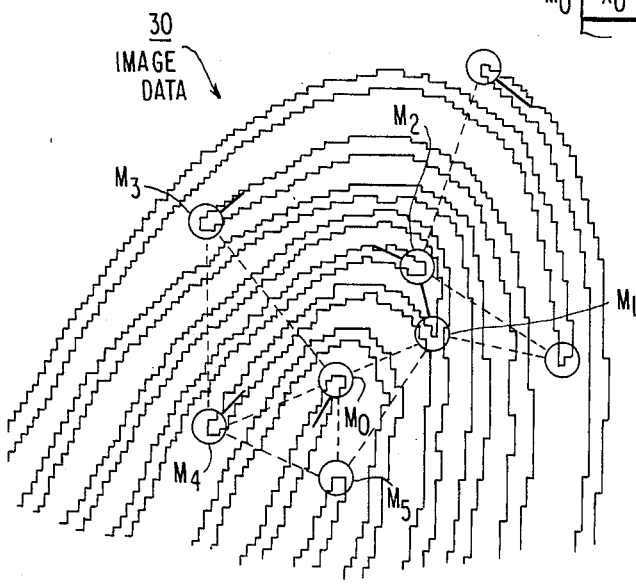
FIG. 3

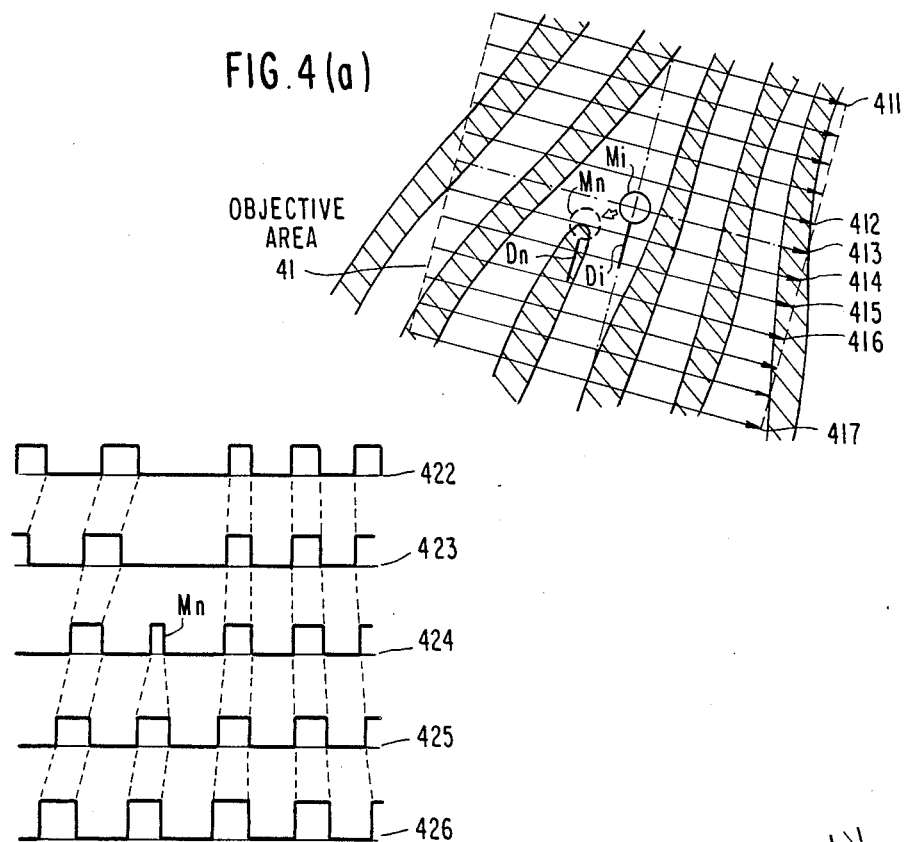
FIG.4(a)
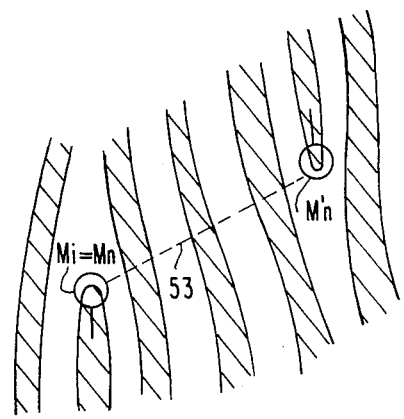
FIG.4(b)
FIG.5(a)
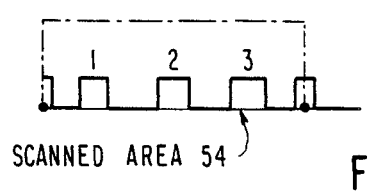
FIG.5(b)

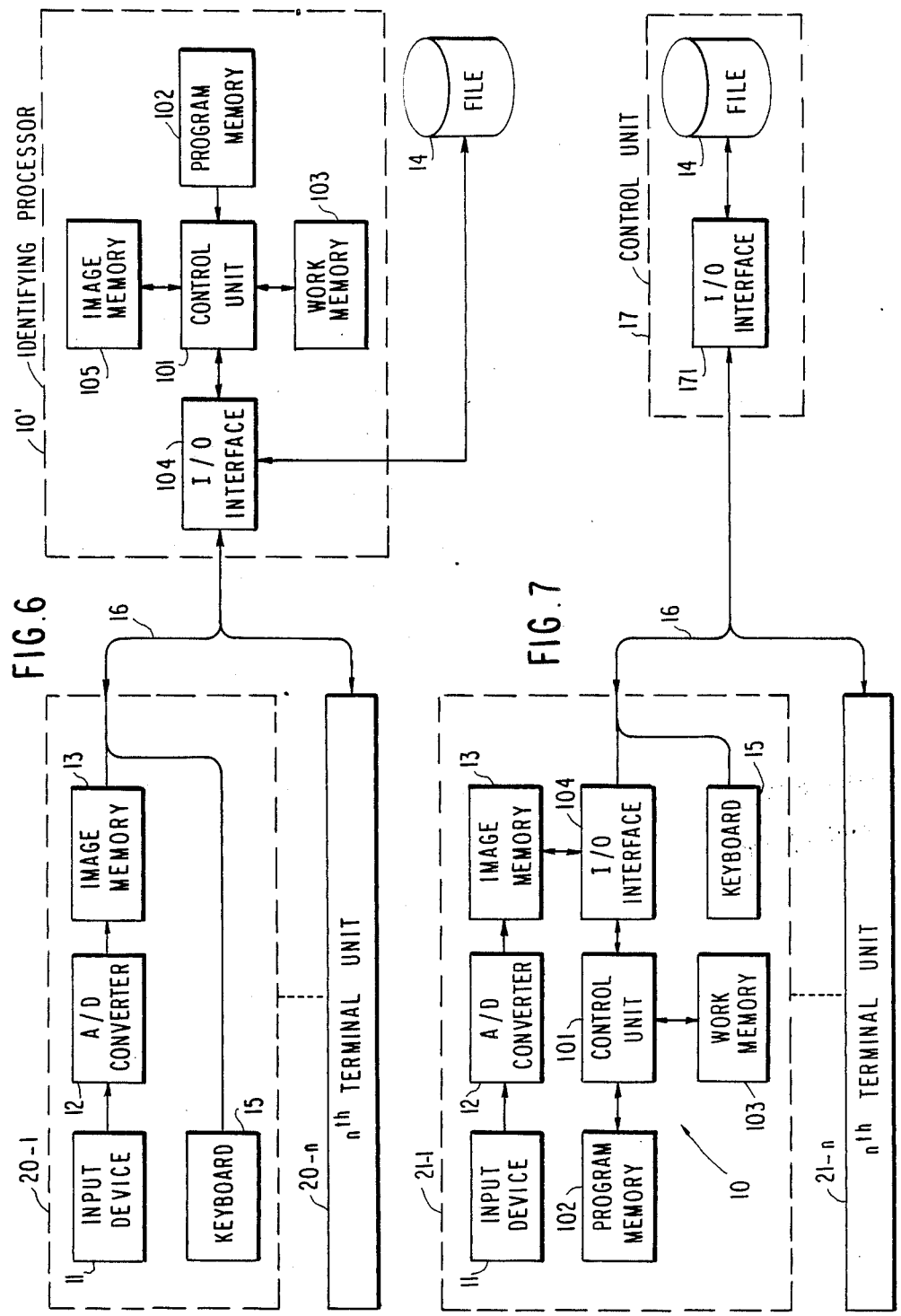

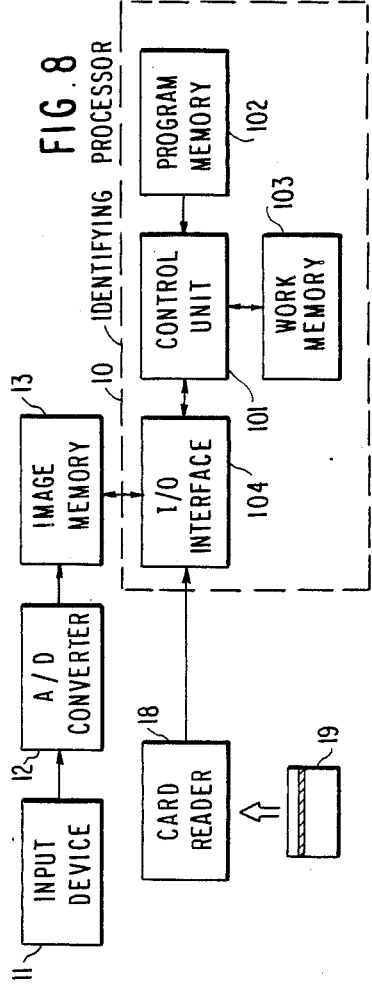
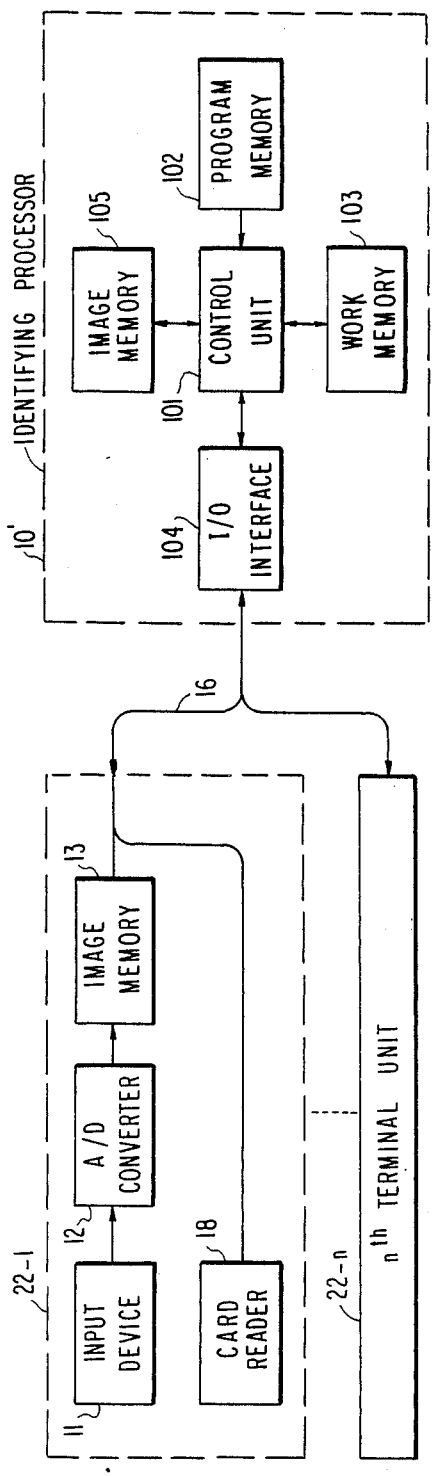

IDENTIFICATION SYSTEM EMPLOYING VERIFICATION OF FINGERPRINTS

This is a continuation of application Ser. No. 134,554, filed Dec. 16, 1987, now abandoned, which is a continuation of Ser. No. 724,232, filed Apr. 17, 1985, now abandoned.

BACKGROUND OF THE INVENTION

The present invention relates to an identification system for identifying authorized personnel by verifying features of his fingerprint.

A system for the identification of personnel is utilized for two kinds of control: i.e. (1) control of entry to and exit from security areas, and (2) control of commercial transactions. In the identification system for the former control, an ID number is given to a particular person instead of a mechanical key. When that person wishes to enter the security area, he inputs his ID number to the system by means of a keyboard or ID card. The system compares the ID number with the registered number to verify the identity of that person. The system permits that person to enter the security area if the predetermined correspondence exists between the ID number and the registered number. Such a system is disclosed in U.S. Pat. No. 3,221,304. The identification system for the latter control is employed in commercial transactions through banks or the like by means of credit cards. The personal identity is confirmed in the same manner as in the former control, and then, the system permits the transaction. Such a system is disclosed in U.S. Pat. No. 3,731,076.

However, because the ID number is used to identify a person, these systems often permits improper users to entry to and exist from the security area or the commercial transactions. Particularly in these days, trouble caused by the unlawful use of credit cards has increased with the increase in the number of credit transactions. Therefore, a reliable inexpensive identification system is desired.

SUMMARY OF THE INVENTION

Therefore, an object of the present invention is to provide an accurate, highly reliable and inexpensive identification system suitable for controlling entry to and exit from security areas and commercial transactions.

The identification system according to the present invention comprises input means for collecting a fingerprint from the front end of a finger and converting the fingerprint to image data; an image memory for storing the image data; means for storing the features of a plurality of fingerprints, the feature including a plurality of feature points and the relationship between one of the feature points and the adjacent feature points; selecting means for selecting one of the features of the plurality of fingerprints; and identifying means for verifying the features of the image data obtained by the input means according to the feature of the fingerprint selected by the selecting means.

BRIEF DESCRIPTION OF THE DRAWING

The above-mentioned and other objects, features and advantages of the present invention will be better understood from the following detailed description of preferred embodiments of the present invention taken in conjunction with the accompanying drawings, wherein:

FIG. 1 is a block diagram of an identification system according to a first embodiment of the present invention.

FIG. 2(a) illustrates pattern features extracted from a fingerprint employed in the identification system shown in FIG. 1.

FIG. 2(b) illustrates a registered recording form of the features of a fingerprint stored in a storing means shown in FIG. 1.

FIG. 3 shows an image data of a fingerprint stored in an image memory shown in FIG. 1.

FIG. 4(a) shows the manipulation for identifying an image data of a fingerprint according to the present invention.

FIG. 4(b) illustrates the scanned data obtained through the manipulation shown in FIG. 4(a).

FIG. 5(a) shows the manipulation for detecting a related feature point according to the present invention.

FIG. 5(b) illustrated the scanned data obtained through the manipulation shown in FIG. 5(a).

FIG. 6 is a block diagram of an identification system according to a second embodiment of the present invention.

FIG. 7 is a block diagram of an identification system according to a third embodiment of the present invention.

FIG. 8 is a block diagram of an identifying system according to a fourth embodiment of the present invention.

FIG. 9 is a block diagram of an identifying system according to a fifth embodiment of the present invention.

DESCRIPTION OF THE PREFERRED EMBODIMENTS

Referring to FIG. 1, an identification system according to a first embodiment of the present invention comprises a keyboard 15, a fingerprint input device 11, an A/D (Analog to Digital) converter 12, an image memory 13, identifying processor 10 and a file such as a magnetic disk drive 14. Each of them is connected to each other by signal lines for transmitting and receiving various data as shown in the drawing.

The fingerprint input device 11 produces a two-dimensional photoelectrically converted image of a fingerprint pattern from the front end of a finger. The input device 11 includes photographing means and an illuminator for collecting the fingerprint pattern by scanning the rear surface of a glass plate where a finger is impressed on the front surface, and utilizing the optical boundary conditions of the glass plate. Such a fingerprint input device 11 is disclosed in Japanese Patent Disclosure Nos. 69300/1979 and 85600/1979.

The photoelectrically converted image from the fingerprint input device 11 is quantified into binary picture element signals by the A/D converter 12 and stored in the image memory 13. Since the A/D converter 12 and the image memory 13, known in the art, are usable for this system, more detailed description thereof is omitted.

An ID code is allocated to each of the registered persons and is entered by means of the keyboard 15. The file 14 stores features of a registered fingerprint corresponding to the ID code, i.e., the positions of feature points (ending and bifurcation points, etc.) of the fingerprint pattern and the relationship between one of the feature points and the adjacent feature points. The ID code from the keyboard 15 is converted to an address indicating the storing position of the file 14 by an input/output interface 104. The data read out from the file 14 is loaded into the work memory 103 of the identifying processor 10 through the input/output interface 104. A control unit 101 checks the corresponding relationship between the two-dimensionally quantified image data stored in the image memory 13 and the features of the fingerprint stored in the work memory 103 according to a program stored in a program memory 102.

Referring to FIGS. 2(a) and 2(b), the pattern features of the registered fingerprint stored in the file 14 will be described.

A streaked pattern is extracted from a registered fingerprint image. The streaks correspond to ridges of the fingerprint. The streaked pattern is thinned by a thinning unit so as to convert it to a skelton pattern as shown in FIG. 2(a). The skelton pattern should have several feature points $M_i$ of at least one type, such as an abrupt ending of a skelton, a bifurcation of a skelton and/or a crosspoint of two or more skeltons. These feature points $M_i$ are usually called minutiaes. Each of the feature points $M_i$ is provided serial number $m_i$.

Positions $(X_i, Y_i)$ and directions $D_i$ of respective feature points $M_i$ are detected from the skelton pattern. Further, the relationships $R_j$ between a reference feature point $M_i$ and adjacent (related) feature points $M_j$ are defined for each of the feature points $M_i$. Each of the relationships $R_j$ comprises the serial number $m_j$ of the related feature point $M_j$ and the number of intersection points $r_j$ of the transverse vector $V_j$, which is drawn from the reference feature point $M_i$ to the related feature point $M_j$, with the inverting skeltons.

That is, with respect to a feature point $M_o$, a position $(X_o, Y_o)$, a direction $D_o$ of the feature point $M_o$ and relationships $R_1$, $R_2$, $R_3$ and $R_4$ to related feature points $M_1$, $M_2$, $M_3$ and $M_4$ are defined. The relationships $R_1$, $R_2$, $R_3$ and $R_4$ includes the number of intersection points $r_1$, $r_2$, $r_3$ and $r_4$ of transverse vectors $V_1$, $V_2$, $V_3$ and $V_4$ with inverting skeltons connecting the serial numbers $m_1$, $m_2$, $m_3$ and $m_4$ of the feature points $M_1$, $M_2$, $M_3$, and $M_4$. The transverse vectors $V_1$, $V_2$, $V_3$ and $V_4$ are drawn from the reference feature point $M_o$ to the related feature points $M_1$, $M_2$, $M_3$ and $M_4$ The feature points $M_i$ and the position $(X_i, Y_i)$, the direction $D_i$ and the relationships $R_j$ to the related feature points $M_j$ of each of the feature points $M_i$ are extracted from the skelton pattern shown in FIG. 2(a) at the time of the registration of a fingerprint.

The file 14 stores the data in the form of a list based on each of the feature points $M_i$ as shown in FIG. 2(b). The detailed definition and the extracting method about the features of the fingerprint is described in U.S. Pat. No. 4,310,827.

FIG. 3 shows image data 30 stored in the image memory 13. The identifying processor 10 verifies the image data 30 in accordance with the features of the registered fingerprint loaded in the work memory 103, that is, the processor 10 checks whether the streaked pattern of the image data 30 has the registered feature point $M_i$ and the relations $R_j$ for some or every feature points.

Referring to FIGS. 4(a), 4(b), 5(a) and 5(b) the identifying process is carried out by the identifying processor 10 in the following manner.

The control unit 101 sets up an objective area 41 on the image data 30 corresponding to a feature point $M_i$ read out from the work memory 103. Subsequently, with the position $(X_i, Y_i)$ of the feature point $M_i$ as an original point, the control unit 101 sets up a plurality of scanning lines 411, ... 412, 413, 414, 415, 416, ... and 417 intersecting the direction $D_i$ of the feature point $M_i$ at a right angle. By scanning the objective area 41 through the scanning lines 412, 413, and 416, scanned data 422, 423, .... and 426 will be obtained as shown in FIG. 4(b).

A feature point (abrupt ending point) $M_n$ of the streaked pattern is detected within the local area 41 by determining the correspondences between pattern edges of the scanned data as shown by dotted lines in FIG. 4(b). The direction $D_n$ of the feature point $M_n$ is determined by averaging the angles of the dotted lines connecting pattern edges of the feature point $M_n$ with respect to the scanning lines 422 to 426 and/or the angles of the dotted lines close to the feature point $M_n$.

The feature point $M_n$ in the objective area 41 is regarded as a candidate corresponding to the registered feature point $M_i$. Then, the differences in the positional displacement and the direction are corrected between the detected feature point $M_n$ and the registered feature point $M_i$.

Subsequently, one of the plurality of relationships $R_j$ concerned with the feature point $M_i$ is read out to set up the next objective area with the position $(X_j, Y_j)$ of the related feature point $M_j$ as an original point on the image data 30. As shown in FIG. 5(a), a feature point $M_n'$ of the streaked pattern is detected in the next objective area in the same manner.

The feature point $M_n'$ is considered as a candidate corresponding to the registered related feature point $M_j$. A transverse vector 53 is drawn from the feature points $M_n$ to $M_n'$. Then, the number of points of intersection of the transverse vector 53 with the inverting streaks is counted by means of the scanned data 54 shown in FIG. 5(b). That number "3" is compared with the registered number of intersection points $r_j$ in the relation $R_j$ for checking whether the candidate feature points $M_n$ and $M_n'$ correspond to the registered feature points $M_i$ and $M_j$.

The control unit 101 effects the above-described process for all related feature points $M_j$ of the plurality of relationships $R_j$ with the feature point $M_n$ $(=M_i)$ as a reference point. Furthermore, the control unit 101 performs the similar verifying process with the related feature points $M_j$ as a reference point. In this way, the control unit 101 checks whether the image data 30 includes a plurality of registered feature points $M_i$ and judges correspondence between the streaked pattern of the image data 30 and the registered fingerprint.

A specialized processor may be used for the identifying processor 10 for the above-described processing purposes, however a general purpose processor may also be used because the identifying process is realized only by linear scanning of the objective area in the image memory 13, and comparing the streaked pattern with the registered feature point.

Thus, the identifying processor 10 verifies linearly scanned image data of the fingerprint from the input means through a simple process by using the pattern features of one of the registered fingerprints selected by the ID code. Therefore, the identity of a person can be confirmed with high accuracy.

Next the system configuration will be described. In the first embodiment, the fingerprint input device 11, the A/D converter 12, the image memory 13, the keyboard 15, the identifying processor 10 and the file 14 are incorporated in one terminal unit to form an identification system. Accordingly, the identification of a person is effected by one stand-alone terminal unit.

A second embodiment of the identification system shown in FIG. 6 comprises an identifying processor 10' provided on the center side and a plurality of terminal units 20-1 to 20-n each connected to the central processor 10' through a transmission line 16. The file 14 is provided on the central processor 10'.

Each of the terminal units 20-1 to 20-n comprises a keyboard 15, a fingerprint input device 11, an A/D converter 12 and an image memory 13. The central processor 10' comprises an input/output interface 104, a control unit 101, a program memory 102, a work memory 103 and an image memory 105, each components being coupled to each other by signal lines for transmitting and receiving various data.

The function of each of these components is the same as like-numbered components of the first embodiment. Each of the terminal units 20-1 to 20-n, for instance, 20-1 is used to convert the image data stored in the image memory 13 and the ID code obtained from the keyboard 15 to transmission data according to established protocol and transmit the data to the identifying processor 10' through the transmission line 16. The image data is stored in the image memory 105 of the central processor 10', whereas the ID code is converted to an address to access the file 14. The pattern features read out from the file 14 is held in the work memory 103. The process thereafter is the same as the first embodiment except for the image memory 105 instead of the image memory 13. An identification result is reported to the terminal unit 20-1.

In this embodiment of the system, one identifying processor and the file 14 are capable of controlling the plurality of terminal units 20-1 to 20-n.

An third embodiment of the identification system shown in FIG. 7 comprises a central unit 17 having a file 14 and a plurality of terminal units 21-1 to 21-n connected to the central unit 17 through the transmission line 16.

Each of the terminal units 21-1 to 21-n comprises a keyboard 15, a fingerprint input device 11, an A/D converter 12, an image memory 13, an input/output interface 104 and an identifying processor 10. The identifying processor 10 comprises a control unit 101, a program memory 102 and a work memory 103, these components being connected to each other by the signal line for transmitting and receiving various data. The functions of these components are the same as those of the like-numbered components of the first embodiment except that the central unit 17 has an input/output interface 171 having functions of address conversion in accordance with the ID code.

Each of the terminal units 21-1 to 21-n, for instance. 21-1 is used to store the image data entered from the fingerprint input device 11 in the image memory 13 and transmit an ID code entered from the keyboard 15 to the central unit 17 through the transmission line 16. The I/O interface 171 of the central unit 17 converts the ID code to an address for accessing the file 14. The pattern features of the registered fingerprint is read out from the file 14, and then, transmitted to the terminal unit 21-1.

The terminal unit 21-1 stores the pattern features of the registered fingerprint in the work memory 103 to compare the pattern features with the image data of the image memory 13. The process for identification is the same as the first embodiment.

In this embodiment, a plurality of the pattern features of registered fingerprints can be stored in the central file 14 commonly to the plurality of terminal units 21-1 to 21-n.

Referring to FIG. 8, an identification system according to a fourth embodiment of the present invention necessitates no ID code input device such as a keyboard nor file for storing the pattern features of registered fingerprints such as a disk drive.

The identification system comprises a card reader 18 for reading data from a memory card 19, the fingerprint input device 11 for collecting a photoelectrical image of a fingerprint from the front end of the finger, an A/D converter 12, an image memory 13 and an identification processor 10. The identifying processor 10 includes a control unit 101, a program memory 102, a work memory 103 and an input/output interface 104.

A fingerprint registrant holds the memory card 19 wherein the pattern features of his fingerprint, that is, the feature points and the relationships of the feature points of the streak pattern of his fingerprint, are recorded in the same form shown in FIG. 2(b). The fingerprint registrant inserts the memory card 19 to the card reader 18 and inputs his fingerprint image by means of the fingerprint input device 11. The fingerprint image is stored to the image memory 13 in a binary form. The card reader 18 reads the pattern features of his fingerprint from the memory card 19 and stores the pattern features to the work memory 103. The control unit 101 verifies the fingerprint image stored in the image memory 13 according to the pattern features of the work memory 103 in the same manner as the first embodiment.

In this embodiment, the fingerprint input device 11, the A/D converter 12, the image memory 13, the card reader 18 and the identifying unit 10 are incorporated in a stand-alone terminal unit.

A fifth embodiment of the identification system shown in FIG. 9 comprises an identifying processor 10' on the center side and a plurality of terminal units 22-1 to 22-n connected to the identifying processor 10' through the transmission line 16.

Each of the terminal units 22-1 to 22-n comprises the card reader 18 for reading the data stored in the memory card 19, the fingerprint input device 11 for collecting a fingerprint image from the front end of the finger, an A/D converter 12 and an image memory 13. The central identifying processor 10' comprises a control unit 101, a program memory 102, a work memory 103, an input/output interface 104 and an image memory 105. The image memory 105 holds the image data sent through the transmission line 16. The functions of the other components are the same as the fourth embodiment of the invention.

Each of the terminal units 22-1 to 22-n, for instance, 22-1 converts the image data stored in the image memory 13 and the pattern features of the registered fingerprint obtained from the card reader 18 to transmission data and send the data to the central processor 10' through the transmission line 16. The image data is stored to the image memory 105 and the pattern features of the registered fingerprint is stored to the work memory 105. The control unit 101 identifies the image data in the image memory 105 referring to the pattern features of the registered fingerprint in the work memory 103 in the same manner to the first embodiment. An identification results is sent back to the terminal unit 22-1.

In this embodiment, the identification of the plurality of image data from the plurality of terminal units 22-1 to 22-n can be completed by one common central processor 10'.

As described above, according to the present invention, the identification of proper personnel can be realized with high reliability since the system identifies personnel by verifying the streaked pattern of his fingerprint. The system can be installed inexpensively and compactly because the processor verifies the fingerprint image referring to only one registered pattern features. The identification system, for instance, can be applied to a cash card system for transactions relating to deposits and savings.

What is claimed is:

1. An identification system comprising:
   input means for collecting a streaked pattern of a fingerprint from a surface of a finger to store a streaked pattern image;
   storing means for storing a plurality of pattern features of a plurality of registered fingerprints, each of said pattern features including at least information identifying within a coordinate system the positions of first and second registered feature points and a registered number of streaks of said registered fingerprints existing between said first and second registered feature points;
   selecting means for selecting one of said pattern features as a reference pattern feature from said storing means; and
   identifying means for verifying correspondence between said streaked pattern image and said reference pattern feature, said identifying means determining at least on the basis of coordinate values first and second objective areas in said streaked pattern image at positions corresponding to said positions of said first and second registered feature points of said reference pattern feature, respectively, scanning said first and second objective areas in order to detect first and second candidate feature points, respectively, counting a number of streaks of said streaked pattern image existing between said first and second candidate feature points to generate a count value, and comparing said count value with said registered number.

2. The identification system as claimed in claim 1, wherein said storing means includes a file means for collectively storing a plurality of pattern features of said registered fingerprints, and said selecting means includes means for inputting an ID code allotted to a fingerprint registrant, said reference pattern feature being selected in said file means in accordance with said ID code.

3. The identification system as claimed in claim 1, wherein said input means, said storing means, said selecting means and said identifying means constitute one terminal unit.

4. The identification system as claimed in claim 1, further comprising:
   a plurality of terminal units each having said input means, and said selecting means;
   a central unit having said storing means and said identifying means; and
   a transmission line for connecting said plurality of terminal units and said central unit.

5. The identification system as claimed in claim 1, further comprising:
   a plurality of terminal units each having said input means, said selecting means and said identifying means;
   a central unit having said storing means; and
   transmission lines for connecting said plurality of terminal units and said central unit.

6. The identification system as claimed in claim 1, wherein said storing means includes memory cards one each respectively held by a plurality of fingerprint registrants for respectively recording said pattern feature corresponding to each said fingerprint registrant, and said selecting means includes card reader means for reading said memory card, said one of said pattern features being read from said recording card by said card reader means and provided to said identifying means.

7. The identification system as claimed in claim 6, wherein said input means, said card reader means and said identifying means constitute one terminal unit.

8. The identification system as claimed in claim 6, further comprising:
   a plurality of terminal units each having said fingerprint input means and said card reader means;
   a central unit having said identifying means; and
   transmission lines for connecting said plurality of terminal units and said central unit.

9. The identification system as claimed in claim 1, wherein said storing means comprises a file memory.

10. The identification system as claimed in claim 1, wherein said storing means comprises a plurality of data bearing cards one of which is retained by each respective fingerprint registrant and means for reading said cards.

11. The identification system as claimed in claim 10, further comprising:
    a work memory for storing the data of a card read by said means for reading.

12. A method for determining whether an individual is included among a plurality of fingerprint registrants, comprising the steps of:
    preparing a plurality of pattern features of fingerprints of said fingerprint registrants, each of said pattern features including at least information identifying within a coordinate system the positions of first and second registered feature points and a registered number of streaks of said fingerprint existing between said first and second registered feature points;
    inputting a streaked pattern of a fingerprint from a surface of a finger of an individual;
    selecting one of said pattern features as a reference pattern feature;
    determining at least on the basis of coordinate values first and second objective areas in said streaked pattern at positions corresponding to said positions of said first and second registered feature points of said reference pattern features;
    scanning in said first and second objective areas to extract first and second candidate feature points, respectively;
    detecting a number of streaks of said streaked pattern existing between said first and second candidate feature points to produce a count value;
    comparing said registered number with said count value to produce a comparing result; and
    determining if there is correspondence between said streaked pattern and said reference feature in response to said comparing result.

13. A method for determining whether an individual is included among a plurality of fingerprint registrants, comprising the steps of:

storing a plurality of pattern features each extracted from a first streaked pattern of a respective registered fingerprint and each including information identifying within a coordinate system first and second positions of first and second registered feature point of said first streaked pattern and a registered number of streaks of said first streaked pattern existing between said first and second feature points;

collecting a second streaked pattern of a fingerprint from a surface of a finger;

selecting one of said pattern features as a reference pattern feature from said storing means;

setting at least on the basis of coordinate values a first objective area in said second streaked pattern at a position corresponding to said first position of said first registered feature point of said reference feature pattern;

detecting a first candidate feature point of said second streaked pattern in said first objective area;

collecting a positional displacement between said first position of said first registered feature point and a position of said first candidate feature point;

setting at least on the basis of coordinate values a second objective area in said second streaked pattern at a position corresponding to said second position of said second registered feature point of said reference pattern feature;

detecting a second candidate feature point of said second streaked pattern in said second objective area;

counting a number of streaks of said second streaked pattern existing between said first and second candidate feature points to output of count value; and identifying correspondence between said first and second streaked pattern by comparing said count value with said registered number.

* * * * *